(12) United States Patent
Han et al.

(10) Patent No.: US 9,847,708 B2
(45) Date of Patent: *Dec. 19, 2017

(54) PFC CIRCUIT

(71) Applicant: Silergy Semiconductor Technology (Hangzhou) LTD, Hangzhou, ZheJiang Province (CN)

(72) Inventors: Yunlong Han, ZheJiang Province (CN); Huiqiang Chen, ZheJiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,104

(22) Filed: May 13, 2016

(65) Prior Publication Data

US 2016/0254743 A1 Sep. 1, 2016

Related U.S. Application Data

(63) Continuation of application No. 14/327,769, filed on Jul. 10, 2014, now Pat. No. 9,391,505.

(30) Foreign Application Priority Data

Jul. 18, 2013 (CN) .......................... 2013 1 0308722

(51) Int. Cl.
*G05F 5/00* (2006.01)
*H02M 1/42* (2007.01)
(Continued)

(52) U.S. Cl.
CPC ....... *H02M 1/4216* (2013.01); *H02M 1/4208* (2013.01); *H02M 7/04* (2013.01);
(Continued)

(58) Field of Classification Search
CPC .... Y02B 70/126; H02M 1/42; H02M 1/4208; H02M 2001/0025; H02M 1/12; H02M 1/126
(Continued)

(56) References Cited

U.S. PATENT DOCUMENTS 4,804,916 A * 2/1989 Frank .................... H02M 1/083
307/33
5,687,070 A * 11/1997 Jacobs ................ H02M 1/4225
323/222

(Continued)

OTHER PUBLICATIONS

Phillip C. Todd; "UC3854 Controlled Power Factor Correction Circuit Design"; Texas Instruments Incorporated; Application Note U-134, Dec. 31, 1999, pp. 269-288.

*Primary Examiner* — Alex Torres-Rivera
(74) *Attorney, Agent, or Firm* — Michael C. Stephens, Jr.

(57) ABSTRACT

In one embodiment, a power factor correction (PFC) circuit can include: (i) a rectifier bridge and a PFC converter coupled to an input capacitor; (ii) a harmonic wave compensation circuit configured to shift a phase of a DC input voltage provided from the rectifier bridge, where the harmonic wave compensation circuit comprises a phase of about −45° when a corner frequency is about 50 Hz; and (iii) a PFC control circuit configured to control the PFC converter, where the PFC control circuit comprises a first sampling voltage, and the harmonic wave compensation circuit is configured to control a phase of the first sampling voltage to lag a phase of the DC input voltage by about 45°.

8 Claims, 9 Drawing Sheets

(51) Int. Cl.
  *H02M 7/04* (2006.01)
  *H02M 1/00* (2006.01)

(52) U.S. Cl.
  CPC .... *H02M 2001/0025* (2013.01); *Y02B 70/126* (2013.01); *Y02P 80/112* (2015.11)

(58) Field of Classification Search
  USPC .............. 323/205, 207, 286; 363/86, 89, 39
  See application file for complete search history.

(56) References Cited

U.S. PATENT DOCUMENTS

| | | | |
|---|---|---|---|
| 7,012,411 | B2 | 3/2006 | Yasukouchi |
| 7,768,346 | B1 | 8/2010 | Terrovitis |
| 8,143,866 | B2 | 3/2012 | Fagnani |
| 8,345,456 | B2 | 1/2013 | Nishikawa |
| 8,493,754 | B1 | 7/2013 | Wambsganss |
| 8,587,968 | B2 | 11/2013 | Zhu et al. |
| 2002/0057125 | A1 | 5/2002 | Demizu |
| 2005/0088159 | A1 | 4/2005 | Itohara |
| 2005/0240362 | A1 | 10/2005 | Randall |
| 2006/0113975 | A1 | 6/2006 | Mednik |
| 2006/0176098 | A1 | 8/2006 | Chen |
| 2007/0076450 | A1* | 4/2007 | Kumar ................ H02M 1/15 363/39 |
| 2008/0197817 | A1* | 8/2008 | Colbeck ............. H02M 1/4225 323/205 |
| 2008/0272748 | A1* | 11/2008 | Melanson .......... H02M 1/4225 323/207 |
| 2010/0246225 | A1 | 9/2010 | Moon |
| 2011/0205772 | A1 | 8/2011 | Hunger |
| 2013/0043849 | A1 | 2/2013 | Pagano |
| 2013/0148387 | A1 | 6/2013 | Ren et al. |
| 2014/0225527 | A1 | 8/2014 | Ge |
| 2014/0254223 | A1* | 9/2014 | Limpaecher ........ H02M 7/4826 363/126 |
| 2014/0320102 | A1 | 10/2014 | Ali |

* cited by examiner

PFC CIRCUIT

RELATED APPLICATIONS

This application is a continuation of the following application, U.S. patent application Ser. No. 14/327,769, filed on Jul. 10, 2014, and which is hereby incorporated by reference as if it is set forth in full in this specification, and which also claims the benefit of Chinese Patent Application No. 201310308722.9, filed on Jul. 18, 2013, which is incorporated herein by reference in its entirety.

FIELD OF THE INVENTION

The present invention generally relates to power converter circuitry, and more particularly to power factor correction (PFC) circuits.

BACKGROUND

Power factor correction (PFC) circuitry is typically added at an input side of a converter to decrease harmonic pollution to the power grid generated by power electric apparatuses. Active PFC may be utilized to increase the power factor of power electric apparatuses to decrease harmonic pollution because the input current can be regulated to be in phase with input voltage. For example, boost PFC topology may be used as an active PFC circuit, such as in high power applications operating in a continuous conduction mode (CCM).

SUMMARY

In one embodiment, a power factor correction (PFC) circuit can include: (i) a rectifier bridge and a PFC converter coupled to an input capacitor; (ii) a harmonic wave compensation circuit configured to shift a phase of a DC input voltage provided from the rectifier bridge, where the harmonic wave compensation circuit comprises a phase of about −45° when a corner frequency is about 50 Hz; and (iii) a PFC control circuit configured to control the PFC converter, where the PFC control circuit comprises a first sampling voltage, and the harmonic wave compensation circuit is configured to control a phase of the first sampling voltage to lag a phase of the DC input voltage by about 45°.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
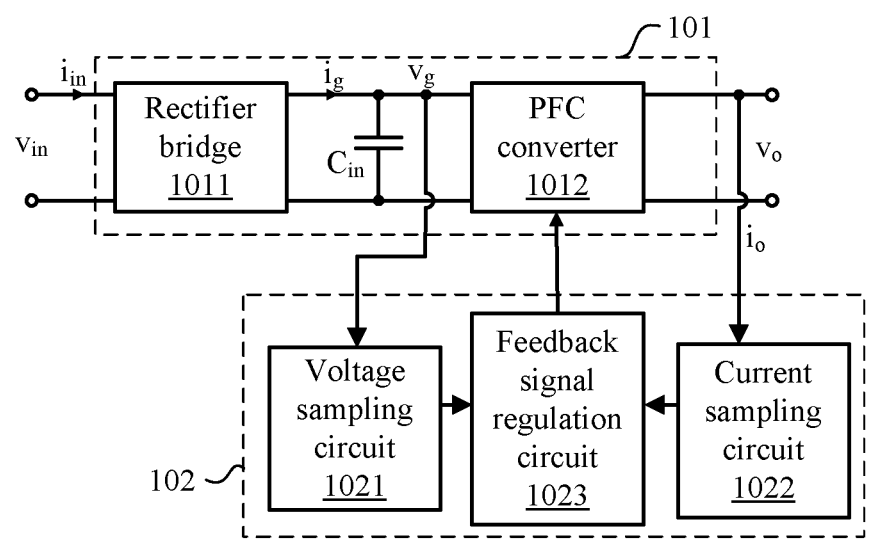
FIG. 1 is a schematic block diagram of an example PFC circuit.

Referring now to FIG. 1, shown is a schematic block diagram of an example power factor correction (PFC) circuit. This example PFC circuit can include power stage circuit 101 and PFC control circuit 102. Power stage circuit 101 may include rectifier bridge 1011 to rectify AC input voltage $V_{in}$ to DC input voltage $V_g$. Power stage circuit 101 may also include input capacitor $C_{in}$ coupled between the two output terminals of rectifier bridge 1011, and configured to filter an output signal of rectifier bridge 1011. Also, PFC converter 1012 can be coupled in parallel with input capacitor $C_{in}$ to generate DC output voltage $V_o$ to supply to loads (e.g., light-emitting diode [LED] loads).

PFC control circuit 102 may include voltage sampling circuit 1021, the input terminal of which can connect to the high voltage output terminal of rectifier bridge 1011 to sample DC input voltage $V_g$. PFC control circuit 102 may also include current sampling circuit 1022, the input terminal of which can connect to the output terminal of PFC converter 1012 to sample output current $i_o$ of power stage circuit 101. PFC control circuit 102 may also include feedback signal regulation circuit 1023 configured to regulate DC input voltage $V_g$ and output current $i_o$ to generate a driving signal to drive PFC converter 1012. The driving signal generated by PFC control circuit 102 may be used to control operation of power stage circuit 101 such that a waveform of AC input current $i_{in}$ varies with a waveform of AC input voltage $V_{in}$ in order to achieve power factor correction (PFC) and improve the overall power factor value.

Because of the capacitive effects of input capacitor $C_{in}$, the phase of DC input current $i_g$ output by rectifier bridge 1011 may be advanced relative to the phase of DC input voltage $V_g$ by about 90°, which may decrease the performance as to AC input current $i_{in}$ varying with AC input voltage $V_{in}$. Furthermore, because output current signal $i_o$ may be regulated by PFC control circuit 102, a component, the phase of which may be advanced relative to AC input voltage $V_{in}$ by about 45°, may be added to the input power. This may also decrease the performance as to AC input current $i_{in}$ varying with AC input voltage $V_{in}$. Thus, due to the influence of input capacitor $C_{in}$ and PFC control circuit 102, the power factor value of the PFC circuit may be reduced due to the performance of AC input current $i_{in}$ varying with AC input voltage $V_{in}$.

In one embodiment, a PFC circuit can include: (i) a rectifier bridge and a PFC converter coupled to an input capacitor; (ii) a harmonic wave compensation circuit configured to shift a phase of a DC input voltage provided from the rectifier bridge, where the harmonic wave compensation circuit comprises a phase of about −45° when a corner frequency is about 50 Hz; and (iii) a PFC control circuit configured to control the PFC converter, where the PFC control circuit comprises a first sampling voltage, and the harmonic wave compensation circuit is configured to control a phase of the first sampling voltage to lag a phase of the DC input voltage by about 45°.

Figure 2:
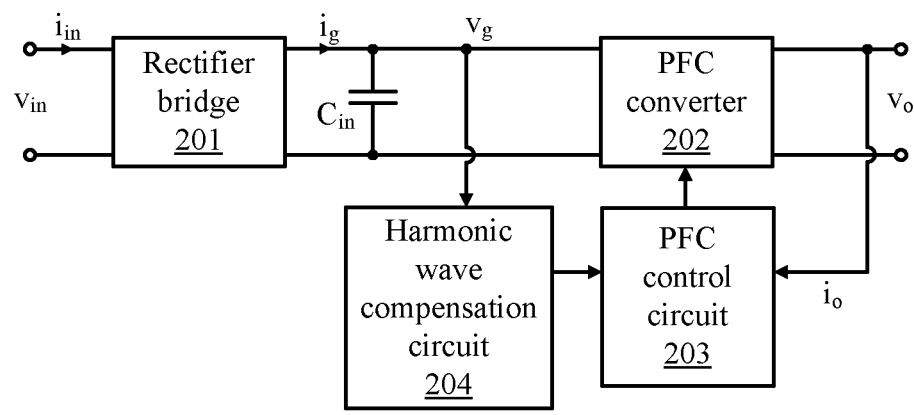
FIG. 2 is a schematic block diagram of a first example PFC circuit, in accordance with embodiments of the present invention.

Referring now to FIG. 2, shown is a schematic block diagram of a first example PFC circuit, in accordance with embodiments of the present invention. This particular example PFC circuit can include rectifier bridge 201, input capacitor $C_{in}$, PFC converter 202, PFC control circuit 203, and harmonic wave compensation circuit 204. The input of harmonic wave compensation circuit 204 can connect to the high voltage output terminal of rectifier bridge 201, and the output of harmonic wave compensation circuit 204 can connect to a voltage sampling input of PFC control circuit 203. Also, a ground terminal harmonic wave compensation circuit 204 can connect to ground (e.g., VSS). For example, a phase of harmonic wave compensation circuit 204 may be about −45° when corner frequency $f_c$ is about 50 Hz.

When corner frequency $f_c$ of harmonic wave compensation circuit 204 is about 50 Hz, the phase of voltage at the output of harmonic wave compensation circuit 204 may lag a phase of DC input voltage $V_g$ at the input of harmonic wave compensation circuit 204 by about 45°, which may lag a phase of AC input voltage $V_{in}$ of the PFC circuit by about 45°. Because an output terminal of harmonic wave compensation circuit 204 can connect to the voltage sampling input terminal of PFC control circuit 203, the phase of the voltage signal received by PFC control circuit 203 may lag a phase of AC input voltage $V_{in}$ by about 45°.

Thus, the phase shift generated by the component, with a phase advanced relative to a phase of input voltage by about 45°, as added to the input power may be counterbalanced. Because PFC control circuit 203 may be configured as a closed loop control mode, the phase shift of about 45° generated by harmonic wave compensation circuit 204 can also decrease the phase shift of AC input current $i_{in}$ advanced relative to AC input voltage $V_{in}$ to some extent. In this way, a PFC circuit of particular embodiments can substantially eliminate the influence of power factor value by PFC control circuit 203 and weaken the influence of power factor value by input capacitor $C_{in}$.

Figure 3:
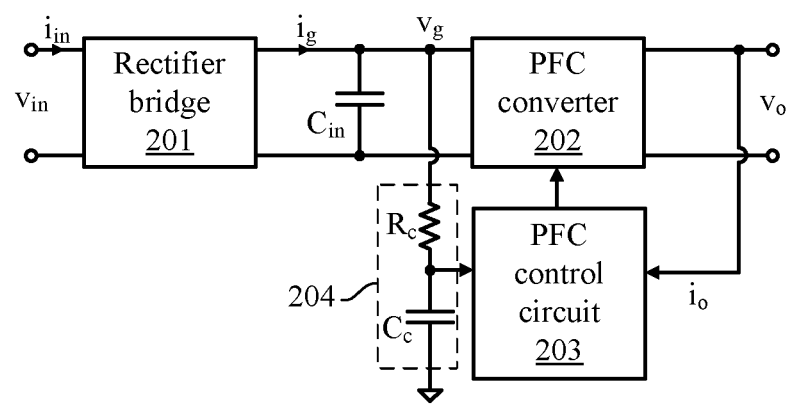
FIG. 3 is a schematic block diagram of a second example PFC circuit, in accordance with embodiments of the present invention.

Referring now to FIG. 3, shown is a schematic block diagram of a second example PFC circuit, in accordance with embodiments of the present invention. This particular example PFC circuit can include rectifier bridge 201, input capacitor $C_{in}$, PFC converter 202, PFC control circuit 203, and harmonic wave compensation circuit 204. An input terminal of harmonic wave compensation circuit 204 can connect to the high voltage output terminal of rectifier bridge 201, and an output terminal of harmonic wave compensation circuit 204 can connect to a voltage sampling input terminal of PFC control circuit 203. For example, a phase of harmonic wave compensation circuit 204 may be about −45° when corner frequency $f_c$ is 50 Hz.

Harmonic wave compensation circuit 204 may include harmonic wave compensation resistor $R_c$ and harmonic wave compensation capacitor $C_c$ coupled in series. The common node of harmonic wave compensation resistor $R_c$ and harmonic wave compensation capacitor $C_c$ may be configured as the output terminal of harmonic wave compensation circuit 204. The other terminal of harmonic wave compensation resistor $R_c$ may be configured as the input terminal of harmonic wave compensation circuit 204. The other terminal of harmonic wave compensation capacitor $C_c$ may be configured as a ground terminal of harmonic wave compensation circuit 204. DC input voltage $V_g$ generated by rectifying AC input voltage $V_{in}$ may be configured as an input signal of harmonic wave compensation circuit 204. Also, a value of corner frequency $f_c$ of the RC first-order filter that includes harmonic wave compensation resistor $R_c$ and harmonic wave compensation capacitor $C_c$ can be determined in accordance with RC filter characteristics.

Figure 4:
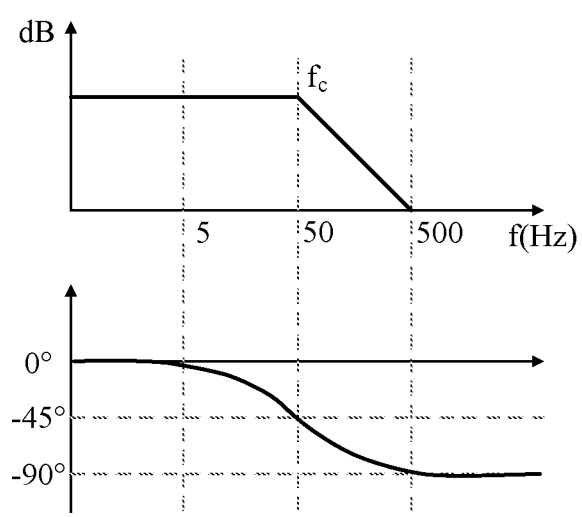
FIG. 4 is an example bode diagram, in accordance with embodiments of the present invention.

Referring now to FIG. 4, shown is an example bode diagram, in accordance with embodiments of the present invention. In this example bode diagram of harmonic wave compensation circuit 204, when corner frequency $f_c$ is about 50 Hz, the corresponding phase is about −45° in the phase diagram. This indicates that the phase of the output voltage of harmonic wave compensation circuit 204 may lag a phase of DC input voltage $V_g$ received at the input terminal by about 45°. Further, this indicates that the phase of the output voltage of harmonic wave compensation circuit 204 may lag a phase of AC input voltage $V_{in}$ of the PFC circuit by about 45°.

Because the output terminal of harmonic wave compensation circuit 204 can connect to the voltage sampling input terminal of PFC control circuit 203, the phase of DC input voltage $V_g$ received by PFC control circuit 203 may lag a phase of AC input voltage $V_{in}$ of the PFC circuit by about 45°. Thus, the phase shift generated by the component with a phase advanced relative to input voltage $V_g$ by 45°, and added to the input power can be counterbalanced based on PFC circuit characteristics.

Figure 5:
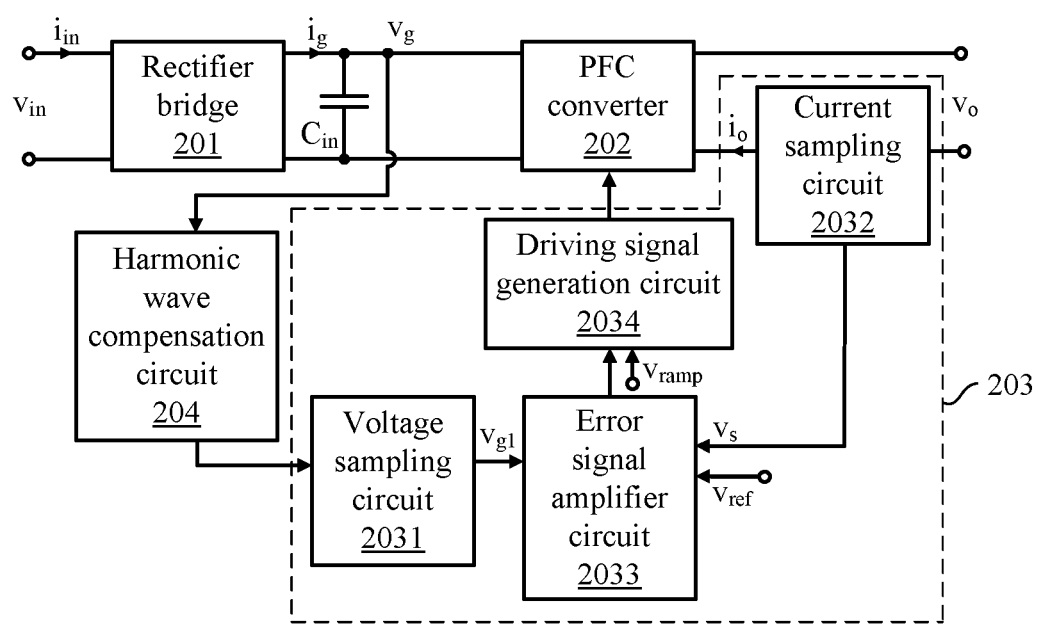
FIG. 5 is a schematic block diagram of a third example PFC circuit, in accordance with embodiments of the present invention.

Referring now to FIG. 5, shown is a schematic block diagram of a third example PFC circuit, in accordance with embodiments of the present invention. This example PFC circuit can include rectifier bridge 201, input capacitor $C_{in}$, PFC converter 202, PFC control circuit 203, and harmonic wave compensation circuit 204. The input terminal of harmonic wave compensation circuit 204 can connect to the high voltage output terminal of rectifier bridge 201, and the output terminal of harmonic wave compensation circuit 204 can connect to the voltage sampling input terminal of PFC control circuit 203. For example, the phase of harmonic wave compensation circuit 204 may be about −45° when corner frequency $f_c$ is about 50 Hz.

PFC control circuit 203 can include voltage sampling circuit 2031, an input terminal of which may be configured as the voltage sampling input terminal of PFC control circuit 203. PFC control circuit 203 may also include current sampling circuit 2032 coupled to an output terminal of PFC converter 202. PFC control circuit 203 may also include error signal amplifier circuit 2033, an input terminal of which can connect to an output terminal of current sampling circuit 2032 and coupled to the output terminal of voltage sampling circuit 2031. PFC control circuit 203 may also include driving signal generation circuit 2034, an input terminal of which can connect to an output terminal of error signal amplifier circuit 2033. An output terminal of driving signal generation circuit 2034 can connect to a power switch (e.g., a transistor gate) of PFC converter 202.

Voltage sampling circuit 2031 may be configured to sample DC input voltage $V_g$ to generate sampling voltage $V_{gi}$. Current sampling circuit 2032 may be configured to sample output current $i_o$ of PFC converter 202 to generate sampling voltage $V_s$. Error signal amplifier circuit 2033 can receive sampling voltage $V_{gi}$, sampling voltage $V_s$, and reference voltage $V_{ref}$ that represents an average value of output current $i_o$. Error signal amplifier circuit 2033 may regulate sampling voltage $V_s$ to generate an error voltage signal. Also, driving signal generation circuit 2034 may compare the error voltage signal against ramp signal $V_{ramp}$ to generate a driving signal to control operation of the power switch of PFC converter 202.

Figure 6:
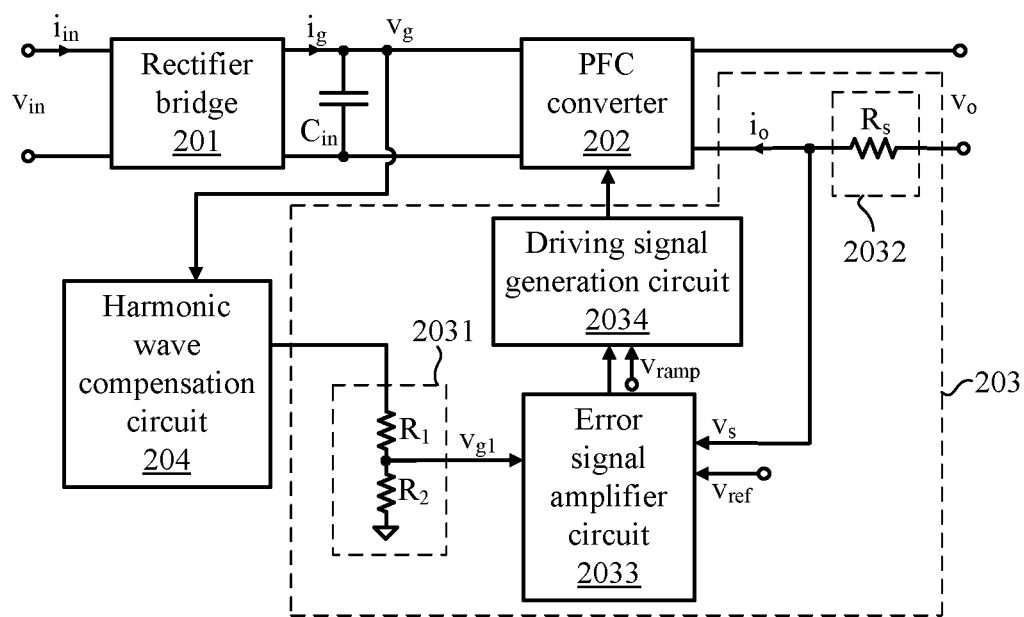
FIG. 6 is a schematic block diagram of a fourth example PFC circuit, in accordance with embodiments of the present invention.

Referring now to FIG. 6, shown is a schematic block diagram of a fourth example PFC circuit, in accordance with embodiments of the present invention. This particular example PFC circuit can as well include rectifier bridge 201, input capacitor $C_{in}$, PFC converter 202, PFC control circuit 203, and harmonic wave compensation circuit 204. The input terminal of harmonic wave compensation circuit 204 can connect to the high voltage output terminal of rectifier bridge 201, and the output terminal of harmonic wave compensation circuit 204 can connect to the voltage sampling input terminal of PFC control circuit 203. For example, a phase of harmonic wave compensation circuit 204 may be about −45° when corner frequency $f_c$ is about 50 Hz.

PFC control circuit 203 include voltage sampling circuit 2031, the input terminal of which may be configured as the voltage sampling input terminal of PFC control circuit 203. PFC control circuit 203 may also include current sampling circuit 2032 coupled to the output terminal of PFC converter 202. PFC control circuit 203 may also include error signal amplifier circuit 2033, the input terminal of which can connect to an output terminal of current sampling circuit 2032, and may be coupled to an output terminal of voltage sampling circuit 2031. PFC control circuit 203 may also include driving signal generation circuit 2034, an input terminal of which can connect to the output terminal of error signal amplifier circuit 2033, and an output terminal of which can connect to the power switch of PFC converter 202.

Voltage sampling circuit 2031 include resistor $R_1$ and resistor $R_2$ coupled in series. The common node between resistor $R_1$ and resistor $R_2$ may be configured as the output terminal of voltage sampling circuit 2031. The other terminal of resistor $R_1$ may be configured as an input terminal of voltage sampling circuit 2031, and the other terminal of resistor $R_2$ can connect to ground. Of course, those skilled in the art will recognize that other voltage sampling circuit implementations can be supported in particular embodiments, and the voltage sampling circuit including resistors $R_1$ and $R_2$ coupled in series represents only one example. Also for example, current sampling circuit 2032 can be implemented by resistor $R_s$, shown as dotted box 2032 in FIG. 6, but other current sampling circuit implementations can also be supported in particular embodiments.

Figure 7:
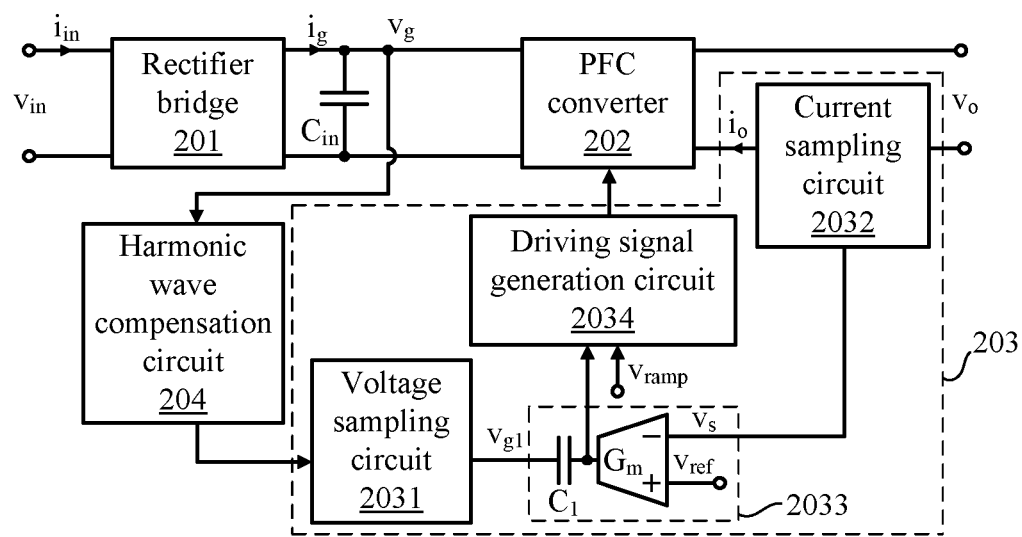
FIG. 7 is a schematic block diagram of a fifth example PFC circuit, in accordance with embodiments of the present invention.

Referring now to FIG. 7, shown is a schematic block diagram of a fifth example PFC circuit, in accordance with embodiments of the present invention. This particular example PFC circuit can include rectifier bridge 201, input capacitor $C_{in}$, PFC converter 202, PFC control circuit 203, and harmonic wave compensation circuit 204. An input terminal of harmonic wave compensation circuit 204 can connect to the high voltage output terminal of rectifier bridge 201, and an output terminal of harmonic wave compensation circuit 204 can connect to the voltage sampling input terminal of PFC control circuit 203. For example, a phase of harmonic wave compensation circuit 204 may be about −45° when corner frequency $f_c$ is about 50 Hz.

PFC control circuit 203 can include voltage sampling circuit 2031, the input terminal of which may be configured as a voltage sampling input terminal of PFC control circuit 203. PFC control circuit 203 can also include current sampling circuit 2032, coupled to the output terminal of PFC converter 202. PFC control circuit 203 can also include error signal amplifier circuit 2033, the input terminal of which can connect to the output terminal of current sampling circuit 2032, and may be coupled to the output terminal of voltage sampling circuit 2031. PFC control circuit 203 can also include driving signal generation circuit 2034, the input terminal of which can connect to the output terminal of error signal amplifier circuit 2033, and the output terminal of which can connect to the power switch of PFC converter 202.

Error signal amplifier circuit 2033 may include operational amplifier $G_m$ and capacitor $C_1$. The inverting input terminal of operational amplifier $G_m$ can connect to the output terminal of current sampling circuit 2032 to receive sampling voltage $V_s$, and the non-inverting input terminal of operational amplifier $G_m$ may receive reference voltage $V_{ref}$. The output terminal of operational amplifier $G_m$ can connect to one terminal of capacitor $C_1$, and the other terminal of capacitor $C_1$ can connect to the output terminal of voltage sampling circuit 2031.

Also, the common node of the output terminal of operational amplifier $G_m$ and capacitor $C_1$ may be configured as the output terminal (e.g., error voltage signal) of error signal amplifier circuit 2033. One terminal of capacitor $C_1$ may receive sampling voltage $V_{gi}$, and the other terminal of capacitor $C_1$ can connect to the output terminal of operational amplifier $G_m$. The error between sampling voltage $V_s$ and reference voltage $V_{ref}$ may be calculated and amplified by operational amplifier $G_m$ to generate the error voltage signal, which may be provided to driving signal generator 2034.

Figure 8:
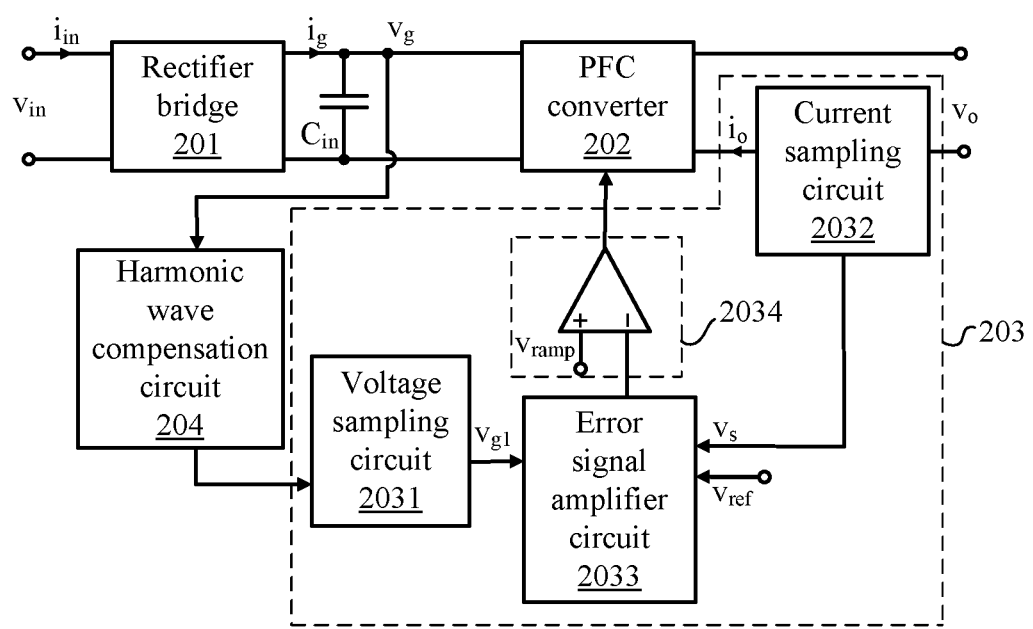
FIG. 8 is a schematic block diagram of a sixth PFC example circuit, in accordance with embodiments of the present invention.

Referring now to FIG. 8, shown is a schematic block diagram of a sixth PFC example circuit, in accordance with embodiments of the present invention. This example PFC circuit can also include rectifier bridge 201, input capacitor $C_{in}$, PFC converter 202, PFC control circuit 203, and harmonic wave compensation circuit 204. The input terminal of harmonic wave compensation circuit 204 can connect to the high voltage output terminal of rectifier bridge 201, and an output terminal of harmonic wave compensation circuit 204 can connect to the voltage sampling input terminal of PFC control circuit 203. For example, a phase of harmonic wave compensation circuit 204 may be about −45° when corner frequency $f_c$ is about 50 Hz.

PFC control circuit 203 can include voltage sampling circuit 2031, the input terminal of which may be configured as the voltage sampling input terminal of PFC control circuit 203. PFC control circuit 203 can also include current sampling circuit 2032, coupled to the output terminal of PFC converter 202. PFC control circuit 203 can also include error signal amplifier circuit 2033, the input terminal of which can connect to an output terminal of current sampling circuit 2032, and can connect to an output terminal of voltage sampling circuit 2031. PFC control circuit 203 can also include driving signal generation circuit 2034, the input terminal of which can connect to an output terminal of error signal amplifier circuit 2033, and the output terminal of which can connect to the power switch of PFC converter 202.

Driving signal generation circuit 2034 may include a comparator. The inverting input terminal of the comparator may receive the error voltage signal from error signal amplifier circuit 2033, and the non-inverting input terminal of the comparator may receive ramp voltage $V_{ramp}$. The output terminal of the comparator may output the driving signal to control and/or drive the power switch of PFC converter 202. For example, PFC converter 202 can be any suitable converter or regulator, such as switched-mode power supply (SMPS) topology (e.g., buck, boost, buck-boost, SEPIC, Zeta, flyback, forward, etc.).

Figure 9:
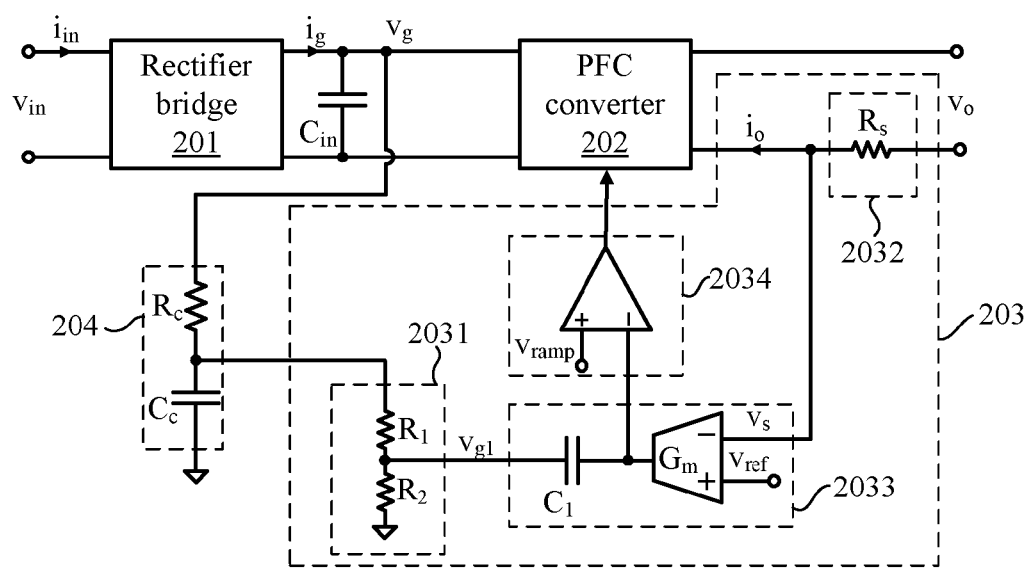
FIG. 9 is a schematic block diagram of a seventh example PFC circuit, in accordance with embodiments of the present invention.

Referring now to FIG. 9, shown is a schematic block diagram of a seventh example PFC circuit, in accordance with embodiments of the present invention. This example PFC circuit can also include rectifier bridge 201, input capacitor $C_{in}$, PFC converter 202, PFC control circuit 203, and harmonic wave compensation circuit 204. The input terminal of harmonic wave compensation circuit 204 can connect to the high voltage output terminal of rectifier bridge 201, and the output terminal of harmonic wave compensation circuit 204 can connect to the voltage sampling input terminal of PFC control circuit 203. For example, a phase of harmonic wave compensation circuit 204 may be about −45° when corner frequency $f_c$ is about 50 Hz.

Harmonic wave compensation circuit 204 can include harmonic wave compensation resistor $R_c$ and harmonic wave compensation capacitor $C_c$ coupled in series. The common node of harmonic wave compensation resistor $R_c$ and harmonic wave compensation capacitor $C_c$ may be configured as the output terminal of harmonic wave compensation circuit 204. The other terminal of harmonic wave compensation resistor $R_c$ may be configured as an input terminal of harmonic wave compensation circuit 204, and the other terminal of harmonic wave compensation capacitor $C_c$ may be grounded.

PFC control circuit 203 can include voltage sampling circuit 2031, current sampling circuit 2032, error signal amplifier circuit 2033, and driving signal generation circuit 2034. Voltage sampling circuit 2031 include resistors $R_1$ and $R_2$ coupled in series, and a common node between resistors $R_1$ and $R_2$ may be configured as an output of voltage sampling circuit 2031. The other terminal of resistor $R_1$ may be configured as an input terminal of voltage sampling circuit 2031, and the other terminal of resistor $R_2$ can connect to ground.

Current sampling circuit 2032 can be implemented by sampling resistor $R_s$. Also, error signal amplifier circuit 2033 may include operational amplifier $G_m$ and capacitor $C_1$. The inverting input terminal of operational amplifier $G_m$ can connect to the output terminal of current sampling circuit 2032 to receive sampling voltage $V_s$, and the non-inverting input terminal of operational amplifier $G_m$ may receive reference voltage $V_{ref}$. The output terminal of operational amplifier $G_m$ can connect to one terminal of capacitor $C_1$, and the other terminal of capacitor $C_1$ can connect to an output terminal of voltage sampling circuit 2031. The common node of the output terminal of operational amplifier $G_m$ and capacitor $C_1$ may be configured as the output terminal (e.g., the error voltage signal) of error signal amplifier circuit 2033. Signal generation circuit 2034 include a comparator. The inverting input terminal of the comparator may receive the error voltage signal, and the non-inverting input terminal of the comparator may receive ramp voltage $V_{ramp}$. The output of the comparator may be configured as the driving signal to drive the power switch of PFC converter 202.

DC input voltage $V_g$ generated by rectifying AC input voltage $V_{in}$ may be received at harmonic wave compensation circuit 204. The value of corner frequency $f_c$ of the RC first-order filter, including harmonic wave compensation resistor $R_c$ and harmonic wave compensation capacitor $C_c$, can be determined to be about 50 Hz based on RC filter characteristics. Thus, the phase of the output voltage of harmonic wave compensation circuit 204 may lag a phase of DC input voltage $V_g$ at the input terminal by about 45°. This can also indicate that the phase of the output voltage of harmonic wave compensation circuit 204 may lag a phase of AC input voltage $V_{in}$ of the PFC circuit by about 45°. Because the output of harmonic wave compensation circuit 204 can connect to the voltage sampling input of PFC control circuit 203, the phase of sampling voltage $V_g$, received at one terminal of capacitor $C_1$ of PFC control circuit 203 may lag a phase of AC input voltage $V_{in}$ by about 45°.

An error between sampling voltage $V_s$ and reference voltage $V_{ref}$ may be determined and amplified by operational amplifier $G_m$. The output of operational amplifier $G_m$ can be coupled to the other terminal of capacitor $C_1$ to generate the error voltage signal. The error voltage signal may be compared against ramp voltage $V_{ramp}$ by driving signal generation circuit 2034 to generate the driving signal to control/drive the power switch (e.g., power transistor) of PFC converter 202. Also, the phase shift generated by the component with a phase advanced relative to the input voltage by about 45° can be counterbalanced by harmonic wave compensation circuit 204.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A power factor correction (PFC) circuit, comprising:
    a) a rectifier bridge and a PFC converter coupled to an input capacitor, wherein said rectifier bridge is configured to receive an AC input voltage;
    b) a harmonic wave compensation circuit configured to shift a phase of a DC input voltage provided from said rectifier bridge, wherein said harmonic wave compensation circuit comprises a phase of −45° when a corner frequency is 50 Hz; and
    c) a PFC control circuit configured to control said PFC converter, wherein said PFC control circuit comprises a first sampling voltage, and said harmonic wave compensation circuit is configured to control a phase of said first sampling voltage to lag the phase of said DC input voltage by 45°.

2. The PFC circuit of claim 1, wherein said harmonic wave compensation circuit comprises:
    a) a harmonic compensation resistor coupled to said DC input voltage and a common node; and
    b) a harmonic compensation capacitor coupled to said common node and ground, wherein said common node is coupled to said PFC control circuit.

3. The PFC circuit of claim 1, wherein said PFC control circuit comprises:
    a) a voltage sampling circuit coupled to said harmonic wave compensation circuit, and being configured to generate said first sampling voltage;

b) a current sampling circuit configured to sample an output current of said PFC converter to generate a second sampling voltage;

c) an error signal amplifier circuit configured to receive said first and second sampling voltages, and a reference voltage that represents an average value of said output current, and to generate an error voltage signal; and d) a driving signal generation circuit configured to receive said error voltage signal and a ramp voltage, and to generate a driving signal based on a comparison of said error voltage signal and said ramp signal, wherein said driving signal is coupled to a power switch of said PFC converter.

4. The PFC circuit of claim 3, wherein said voltage sampling circuit comprises:

a) a first resistor coupled to said harmonic wave compensation circuit and a common node; and b) a second resistor coupled to ground and said common node, wherein a voltage at said common node is configured as said first sampling voltage.

5. The PFC circuit of claim 3, wherein said error signal amplifier circuit comprises:

a) an operational amplifier having an inverting input coupled to said second sampling voltage, and a non-inverting input coupled to said reference voltage; and b) a capacitor coupled to said first sampling voltage, and to an output of said operational amplifier at a common node that is configured as said error voltage signal.

6. The PFC circuit of claim 3, wherein said driving signal generation circuit comprises a comparator having an inverting input coupled to said error voltage signal, a non-inverting input coupled to said ramp voltage, and an output configured as said driving signal.

7. The PFC circuit of claim 3, wherein said current sampling circuit comprises a sampling resistor coupled to said output of said PFC converter.

8. The PFC circuit of claim 1, wherein the phase of said DC input voltage lags a phase of said AC input voltage by 45° when said corner frequency is 50 Hz.

* * * * *